Figure 1:
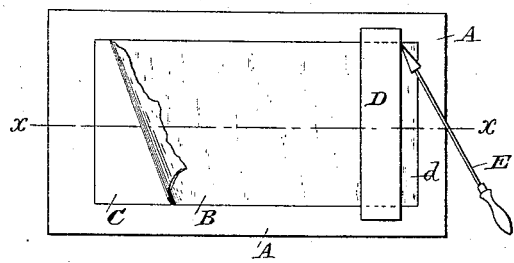

(No Model.)

J. H. J. HAINES.
ART OF WELDING METAL FOIL.

No. 407,399. Patented July 23, 1889.

Attest:
Geo. T. Smallwood.
Philip Mauro

Inventor
John H. J. Haines
by J. Pollok, his attorney

UNITED STATES PATENT OFFICE.

JOHN H. J. HAINES, OF FLUSHING, NEW YORK, ASSIGNOR OF ONE-HALF TO ALEXANDER B. FERNALD, OF JERSEY CITY, NEW JERSEY.

ART OF WELDING METAL FOIL.

SPECIFICATION forming part of Letters Patent No. 407,399, dated July 23, 1889.

Application filed May 24, 1889. Serial No. 311,923. (No model.)

*To all whom it may concern:*

Be it known that I, JOHN H. J. HAINES, of Flushing, in the county of Queens and State of New York, have invented a new and useful Improvement in Welding Metal Foil; which improvement is fully set forth in the following specification.

My invention consists of a novel art of forming joints between pieces of metal foil or between a piece of foil and a metal plate or other heavier piece of metal; and it consists, essentially, in pressing the sheet of foil or thin metal against the surface of the metal (whether foil or heavier metal) to which it is to be joined along the line of proposed union, and by such means as will leave the metal fully exposed up to such line, and then while the foil is so pressed removing entirely the foil projecting along the line of pressure, and running a fusing device along the exposed edge or edges, thereby fusing the metal under pressure, as hereinafter more fully described. The two acts of removing wholly the metal projecting beyond the compressing device and fusing the surface or surfaces under compression may be and preferably are performed at one operation and by the same tool.

My invention is especially applicable to joining pieces or sheets of tin-foil together, and may in such cases be readily practiced without the use of solder or flux. Tin-foil may also be joined to sheets or pieces of other metal—such, for instance, as brass; but in this case I prefer to employ some suitable flux—such, for instance, as sal-ammoniac. In the joining of other metal to metal foil or to pieces of thicker metal a flux suited to the character of the materials may be employed, though in the joining of foil to foil I do not by any means limit myself to the use of a flux.

The usual form of soldering-iron serves the ordinary purposes of my invention, though the device employed for fusing or melting away the foil may be indefinitely varied, and variations in the form of the soldering-iron may be sometimes found desirable for particular classes of work. The pressure employed should be sufficient to keep the metal surfaces in close connection. When this is done and when the pressure device is of the proper shape to allow the metal to be removed up to the line of proposed union and the heating device to be applied to the metal at the edge of the area of pressure, a joint will be formed by the melting of the material just within the edge of the pressure area, owing to the conduction of the heat inward to the material where it is pressed. Such joint will, in fact, be of the nature of a welded joint and will moreover be a clean, smooth one, destitute of the projecting lug of cast metal formed on the edges outside of the area of pressure, as would be the case if the metal which is free or exposed were melted and allowed to adhere, as has heretofore been done.

Any means for holding the foil down against the surface to which it is to be united may be employed, provided it leaves the metal fully exposed to the application of the heating right up to the line of pressure. A plate or block of iron or of glass, or of any other material, will serve the purpose. In the case of a straight joint the edge of the holding block or plate may be made straight, and in the case of joints formed on other lines the edge of the holding plate or block should have a corresponding form.

Having thus described in general the nature of my invention and the manner of practicing the art, I will proceed to describe the same in connection with the accompanying drawings, in which—

Figure 2:
Figure 3:
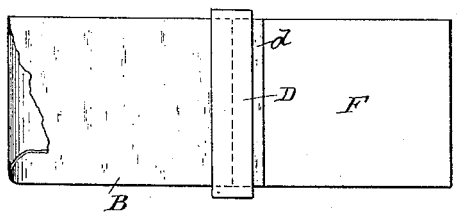
Figure 4:
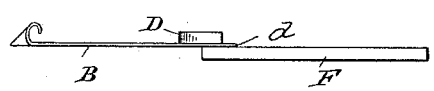
Figure 5:
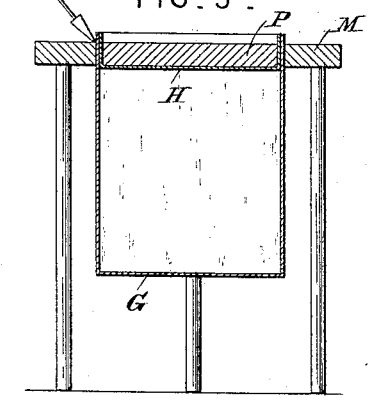
Figure 6:
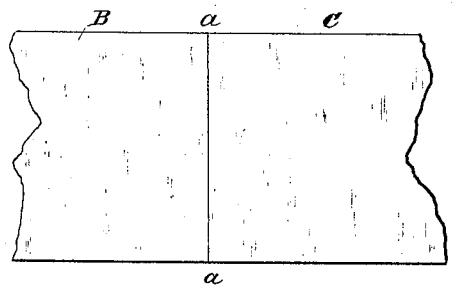

Figure 1 is a plan view of apparatus and work involving my invention. Fig. 2 is a vertical cross-section of Fig. 1. Fig. 3 illustrates the manner of joining tin-foil to a brass plate. Fig. 4 is a vertical cross-section of Fig. 3. Fig. 5 shows in vertical section another form of apparatus suited to a special kind of work. Fig. 6 shows the two sheets of foil, Fig. 1, as joined together.

Referring to Figs. 1 and 2, A indicates a bed-plate of any material upon which the work may be laid. In the joining of foil to foil it is desirable that the surface of the plate should be rather hard and smooth. Glass, metal, or wood will serve as the material for the bed-plate.

B C indicate, respectively, sheets of tin-foil to be joined together on the line *a a*. (Indicated in Fig. 6.)

D indicates a block or plate, of glass or other material, having a straight edge corresponding to the line *a a*, and adapted to press the foil B C closely together on a line abutting upon or just adjacent to the line of proposed union. Positive pressure, as of the hand, may be applied, or the weight of the block itself may be relied upon to compress the sheets of foil. The width of the block or the extent of the area of pressure back of the joint seems to be quite immaterial.

E indicates a form of tool which may be used in practicing my invention, and which consists simply of a heated piece of metal like a soldering-iron heated to a sufficient degree to melt the foil.

In practicing the invention with such a tool, the iron is passed over the foil and against the edge of the holding-piece, so as to remove the surplus metal beyond the limit of proposed union—that is to say, the material beyond the edge of the line of pressure—and at the same time or directly following upon such removal to heat the metal at the edge of the area of pressure, so as to form a joint on the line of proposed union. In this operation the surplus metal is removed by the wiping action of the tool as it comes into contact with and melts the metal projecting from the clamping edge of the block. The removal of the surplus material up to such edge might be accomplished in other ways without departing from the spirit of my invention, the design being to produce a joint without surplus attached metal, and by the direct application of the heat to the metal at the edge of the clamping surface, so as to produce a union within such edge. The use of a heated wiping-tool, as described, is preferable, however, because the operations of removing the surplus metal beyond the clamping edge and the application of the heating-tool to the edge of the material on the direct edge of the line of pressure are practically simultaneous.

In Figs. 3 and 4 a plate of brass is indicated at F, and a sheet of tin-foil to be united thereto is indicated at *d*. The operation is substantially the same as before. Sal-ammoniac or other flux is laid upon the exposed portion of the foil, and the iron or tool passed over the same and so as to melt and remove the foil up to the pressure edge of the holding-plate D. The joint will be formed at and just within the edge of the holding or compressing plate.

Fig. 5 illustrates a device that may be used for practicing my invention in sealing the cover of a can or package G. The package G may be of tin-foil, and the cover-plate H, also of foil, is secured thereto by joining or sealing its upturned edge to the upper edge of the receptacle G. In performing this operation the body of the package G is supported with its upper end in a circular holder M, of iron or other suitable material, and with its edge projecting just above the surface of the iron. The upturned edge of the cover H is pressed against the upper portion of the body G, as indicated, by means of a clamping or holding ring or washer P, adapted to fit into place rather snugly, so as to compress the two sheets of foil between it and the holder M, with a part of each sheet projecting. On passing a soldering or fusing iron over the exposed edge of the foil an air-tight joint will be formed just at the upper clamping edge of the plates or holders, the material projecting beyond their meeting edge being removed.

I am aware that it has been heretofore proposed to unite sheet metal by holding the material in a clamp having a groove and melting the metal in a groove, thus, as it were, molding upon the edge of the sheets a ridge of metal. Such process is not, however, adapted to the production of a welded joint such as is provided in my invention, because the heating device cannot be directly applied to the edge of the foil at the edge of the clamping surfaces, which edge is sunk beneath the surface of the clamp, and because the heat of the mass of molten material lying in the groove is conveyed away by the material of the clamp. Moreover, the surplus material lying beyond the clamping edge is not removed, but remains molded on the edge of the sheet metal.

Having now fully described my said invention, what I claim is—

1. The herein-described improvement in the art of forming a metal-foil joint by clamping the foil along the line of proposed union, removing entirely the surplus metal beyond the line of pressure, and applying the fusing-tool directly to the edge of the foil, thereby fusing the metal within the line of pressure and producing a joint which lies wholly within such line, as set forth.

2. The improvement in the art of forming a metal-foil joint, which improvement consists in clamping the foil along the line of proposed union and applying a fusing device to the surface of the foil directly along the edges of the clamping device, thereby effecting a separation of the foil at such line, and at the same operation fusing the foil under pressure, as set forth.

In testimony whereof I have signed this specification in the presence of two subscribing witnesses.

JOHN H. J. HAINES.

Witnesses:
L. H. ROGERS,
HOWARD WHITFIELD.